United States Patent [19]
Maruyama et al.

[11] Patent Number: 5,531,153
[45] Date of Patent: Jul. 2, 1996

[54] BREAD BAKING APPARATUS

[75] Inventors: Eiki Maruyama; Makoto Nasu; Yoshisada Misawa, all of Magano; Soichi Takeda, Togura-Machi, all of Japan

[73] Assignee: MK Seiko, Co., Ltd., Nagano-Pref., Japan

[21] Appl. No.: 293,067

[22] Filed: Aug. 19, 1994

[51] Int. Cl.$^6$ ................................................ A47J 27/00
[52] U.S. Cl. ............................... 99/327; 99/332; 99/348; 99/468; 364/143; 364/400; 364/557; 366/98; 366/146; 366/601
[58] Field of Search .................... 99/325–328, 331–333, 99/342, 344, 348, 468, 486; 219/492, 494, 501; 364/140, 141, 143, 400, 477, 550, 557; 366/98, 144–146, 314, 601; 426/231–233, 503, 504, 523

[56] References Cited

U.S. PATENT DOCUMENTS

| | | | |
|---|---|---|---|
| 4,844,048 | 7/1989 | Aruga et al. | 99/348 |
| 4,951,559 | 8/1990 | Arao et al. | 99/468 |
| 4,984,512 | 1/1991 | Takahashi et al. | 99/327 |
| 5,363,746 | 11/1994 | Gordon | 366/601 |
| 5,386,763 | 2/1995 | Chen | 99/331 |
| 5,392,695 | 2/1995 | Junkel | 366/98 |
| 5,426,580 | 6/1995 | Yoshida et al. | 364/143 |

*Primary Examiner*—Timothy F. Simone
*Attorney, Agent, or Firm*—Harris, Wallen, MacDermott & Tinsley

[57] ABSTRACT

A bread baking apparatus having a bread container, a mixer for mixing ingredients in the container to form a dough, and an oven for baking the dough, and further having a storage unit for storing a plurality of bread types, bread recipes and bread processing operating times, a display unit for displaying the plurality of bread types, a selection unit for selecting one of the displayed bread types, with the display unit further displaying the recipe of the selected bread type, a control unit for controlling the time of operation of the apparatus, and a start unit for starting the mixing and baking. A method of baking bread utilizing such baking apparatus.

1 Claim, 4 Drawing Sheets

BREAD BAKING APPARATUS

BACKGROUND OF THE INVENTION

This invention relates to an improvement in the automatic bread cooking apparatus now in wide use. In a typical conventional apparatus, the operator utilizes a printed or manuscript recipe, assembles the ingredients and quantities pursuant to the recipe and places the ingredients in the baking container. The lid is closed and the operator actuates the start switch. The apparatus operates under automatic control to knead the dough and bake the dough into bread, shutting off when the process is completed.

The conventional devices presently in use provide a fixed time for kneading and a fixed time and temperature for baking. In some units the operator may be able to set the times and temperature. However, such equipment requires reference by the operator to external recipe information and time and temperature information.

It is an object of the present invention to provide a new and improved bread making apparatus and method which apparatus provides the operator with a direct display of a number of types of bread which can be produced by the apparatus, a recipe for each of the available types, and an indication of the time required for completion of the process. An additional object of the invention to provide such an apparatus and method wherein the operator can select the desired type of bread and control the operation by a keyboard on the apparatus associated with a visual display on the apparatus.

Other objects, advantages, features and results will more fully appear in the course of the following description.

SUMMARY OF THE INVENTION

The presently preferred embodiment of the invention includes a bread baking apparatus having a bread container, a mixer for mixing ingredients in the container to form a dough, and an oven for baking the dough, with an improvement comprising storage means for storing a plurality of bread types, bread recipes, and bread processing operating times, display means for displaying the plurality of bread types, selection means for selecting one of the displayed bread types, the display means further including means for displaying the recipe of the selected bread type, control means for controlling the time of operation of the apparatus, and start means for starting the mixing and baking.

The preferred embodiment also includes a method of baking bread utilizing a baking apparatus having a bread container, a mixer for mixing ingredients in the container to form a dough, an oven for baking the dough, storage means for storing a plurality of bread types with a recipe and bread processing operating times for each type, and display means for displaying bread types and bread type recipes, with the steps of displaying a plurality of bread types, selecting one of the plurality of bread types, displaying the recipe of the selected bread type, placing the ingredients of the selected recipe in the bread container, and starting the operation of the apparatus.

DESCRIPTION OF THE PREFERRED EMBODIMENT

Figure 1:
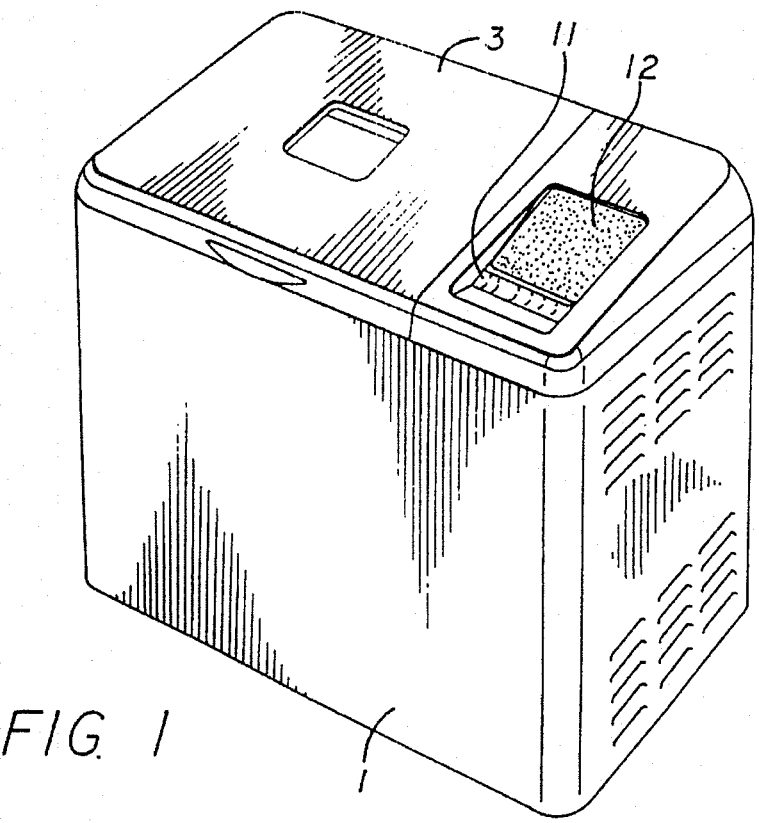
FIG. 1 is a perspective view of a bread baking apparatus incorporating the presently preferred embodiment of the invention.
Figure 2:
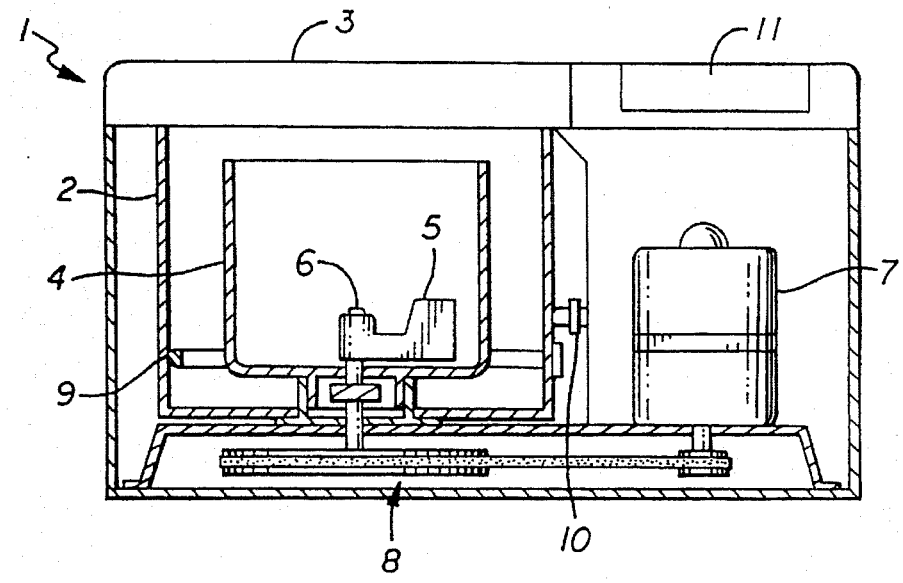
FIG. 2 is a vertical sectional view through the apparatus of FIG. 1 showing the internal arrangement of components.
Figure 3:
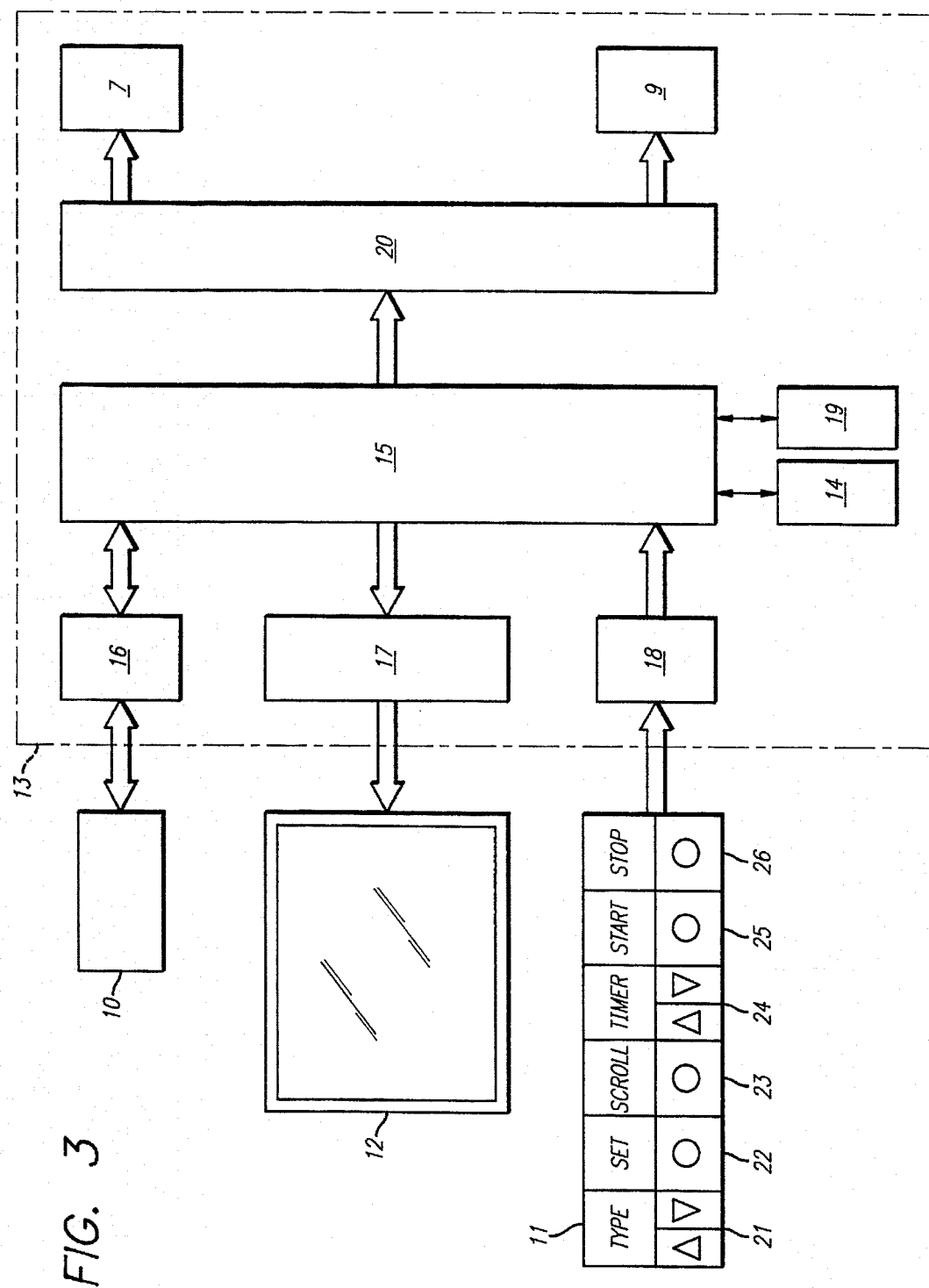
FIG. 3 is a functional block diagram of the apparatus of FIGS. 1 and 2.

The bread baking apparatus as illustrated in FIGS. 1 and 2 include a main body 1, an inner case 2 mounted within the main body, and a lid 3 for closing and opening the main body 1. A rectangular boxed shape container 4 is removably mounted in the inner case 2, with a rotating impeller 5 carried on a shaft 6 projecting upward from the bottom of the container 4. An electric motor 7 drives the impeller 5 through a pulley and belt transmission system 8. An electric heater 9 is positioned around the container 4 within the inner case 2. A temperature sensor 10 is mounted on the outer side wall of the inner case 2. An operator control panel 11 and a display unit 12, preferably an LCD display, are positioned at the top of the main body 1 adjacent the lid 3. The construction and operation of the apparatus described thusfar, except for the control panel 11 and display 12, are conventional.

A control unit 13 is positioned within the main body 1, preferably adjacent the control panel 11. The control unit includes a central processing unit (CPU) 15 with a built in read only memory (ROM) 14 and a timer 19. The recipe and operating sequence for each of a plurality of types of bread are stored in the ROM. A temperature detector 16 has the output of the temperature sensor 10 as in input and provides temperature signals to the CPU. A drive board 17 provides display signals from the CPU to the display unit 12. An input/output interface unit 18 connects signals from the control panel 11 to the CPU. A relay board 20 provides controls for the motor 7 and heater 9 in response to signals from the CPU.

The operator control panel 11 includes six keys or pairs of keys for operating the apparatus. Key pair 21 provides for selecting the type of bread to be baked from the available types stored in the memory and displayed as shown in FIG. 5(b). One key of the pair moves a cursor 27 upward along the list of types and the other key of the pair moves the cursor downward. After selection of the type with the key pair 21, a set key 22 sets the selected type. A scroll key 23 provides for scrolling through the bread type list. A timer pair of keys 24 provides for setting the time, with one key of the pair decreasing the time and the other increasing the time. Start key 25 starts the operation of the bread making and stop key 26 stops the operation.

Figure 4:
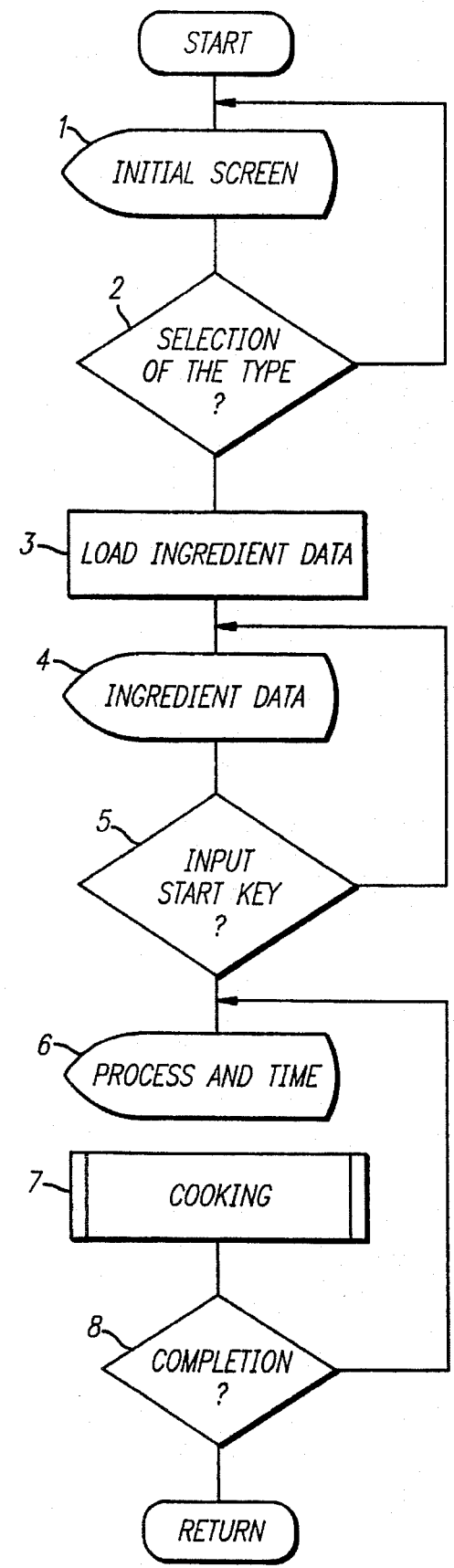
FIG. 4 is a flow chart illustrating the method of operation of the apparatus of FIGS. 1–3.

An example of the operation of the apparatus of the invention is shown in FIGS. 4 and 5.

Figure 5A:
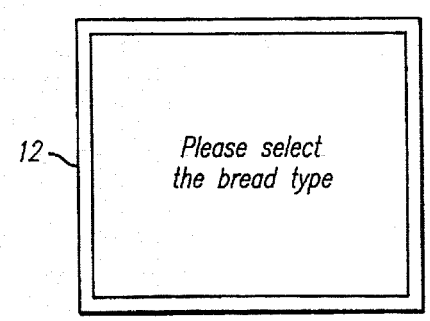
FIGS. 5(a), (b), (c) and (d) illustrate the text of the display at various stages of the bread making method.
Figure 5B:
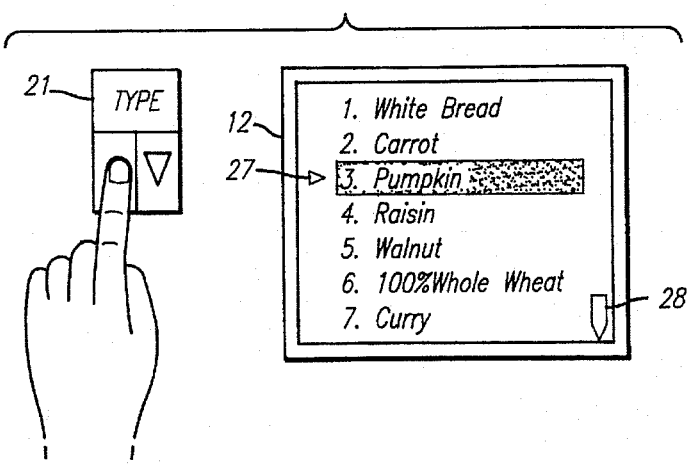

When electric power is supplied to the apparatus, the text "Please select the bread type" is displayed as shown in FIG. 5(a) on the initial screen of the display unit 12, FIG. 4 (1).

Next the type keys 21 are actuated to select one of the bread types, as shown in FIG. 5(b). There will be a waiting state before the type decision can be inputted by the set key 22, FIG. 4 (2). The character "c" at 28 is displayed on the display screen as shown in FIG. 5(b), indicating there is a continued display which can be viewed by using the scroll key 23.

Figure 5C:
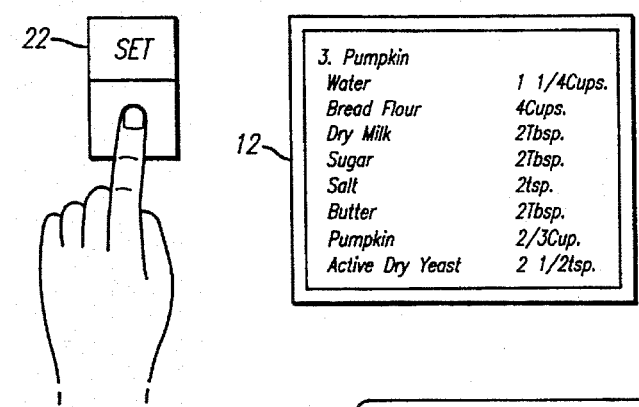

After the bread type is selected, the ingredient data or recipe stored in ROM 14 is retrieved, FIG. 4 (3) and displayed on display unit 12, as shown in FIG. 5(c), FIG. 4

(4). In the example illustrated, "Pumpkin" type bread has been selected, as shown on the screen in FIG. 5(b). The operator then starts the bread making process by putting the indicated ingredients into the container 4 and pressing the start key 25, FIG. 4 (5). The cooking of the selected bread type begins, FIG. 4 (6).

Figure 5D:
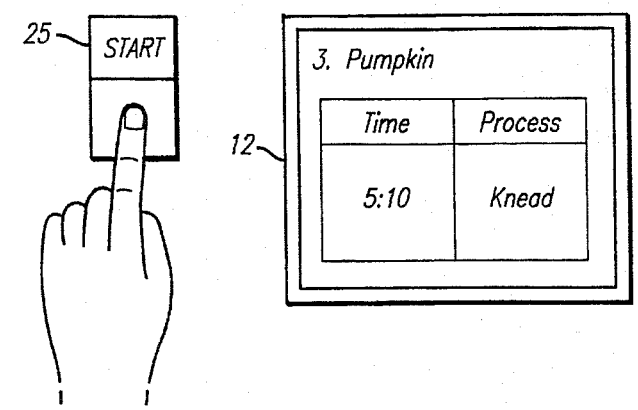

On actuation of the start key 25, the display of the ingredient list of FIG. 5(c) in the display unit 12, changes to a display as seen in FIG. 5(d) indicating the name of the selected bread type, the process step of the cooking (in this case, "knead"), and the time needed to complete the bread cooking, FIG. 4 (7). When the bread cooking is finished, FIG. 4 (8), the display is automatically returned to the initial screen FIG. 5(a). The FIG. 5(d) display initially shows the total time required for the process of kneading, rising and baking for the selected bread type, namely 5 hours and 10 minutes for pumpkin bread.

The time display counts down by minutes and the display "0:00" indicates that the bread is finished. The display also changes to show the current step taking place in the process.

The duration and sequence of operation of the motor and the heater is automatically controlled by the CPU based on the information stored in the ROM.

The temperature sensor 10 monitors the temperature in the apparatus and provides temperature data to the CPU for controlling the heater to maintain the desired even temperature.

The stop switch 26 may be actuated when the display shows bread types (FIG. 5(b)) or recipes (FIG. 5(c)) to return to the initial display (FIG. 5(a)), and when in the bread making process (FIG. 5(d)) to terminate all action.

Thus, it is seen that the bread making apparatus and method of the present invention does away with the need for cook books and recipe cards and the associated problems of misplacing or losing them, and the defacing of the text by repeated reference thereto. Ordinarily such information sources are not part of the bread making apparatus and are not stored with the apparatus. Also the various ingredients and amounts are directly in front of the operator, obviating any errors due to reliance on memory. The continous presentation of time remaining to completion is useful information for a busy cook.

We claim:

1. In a bread baking apparatus having a bread container, a mixer for mixing ingredients in said container to form a dough, and an oven for baking the dough, the improvement comprising in combination:

storage means for storing bread baking information, including a plurality of bread types, bread recipes and bread processing operating times;

display means including a single screen for displaying said information;

selection means for selecting one of said displayed bread types;

set means for setting said selected bread type;

control means for controlling the time of operation of said apparatus;

power means for connecting electric power to said apparatus; and start means for starting said mixing and baking;

said display means further including:

means for displaying a bread type selection instruction on actuation of said power means;

means for displaying a plurality of bread types;

means for displaying the recipe for the selected bread type after actuation of said selection means and said set means; and means for displaying the status of the baking process as it proceeds after actuation of said start means.

* * * * *